Figure 1:
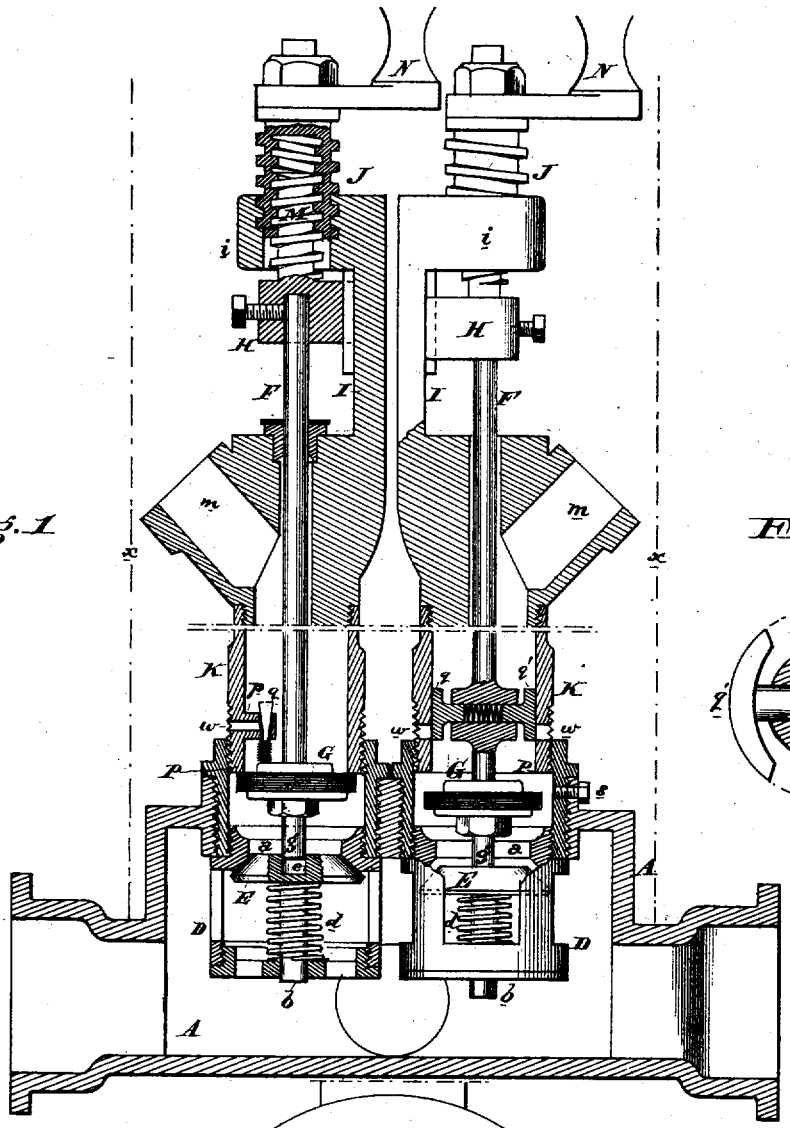

W. H. McMILLAN,

Assignor to S. R. C. MATHEWS.

HYDRANT.

No. 9,964. Reissued Dec. 13, 1881.

Attests

M A Richards

Inventor

William H McMillan

By his atty

N. PETERS, Photo-Lithographer, Washington, D. C.

UNITED STATES PATENT OFFICE.

WILLIAM H. McMILLAN, OF SOUTH BEND, KANSAS, ASSIGNOR TO SAMUEL R. C. MATHEWS, OF PHILADELPHIA, PENNSYLVANIA.

HYDRANT.

SPECIFICATION forming part of Reissued Letters Patent No. 9,964, dated December 13, 1881.

Original No. 164,856, dated June 22, 1875. Application for reissue filed April 30, 1881.

*To all whom it may concern:*

Be it known that I, WILLIAM H. McMILLAN, now of South Bend, in the county of Morris and State of Kansas, and formerly of Philadelphia, State of Pennsylvania, have invented new and useful Improvements in Hydrants and Fire-Plugs, of which the following is a specification, reference being had to the accompanying drawings, which form part thereof.

My invention relates to hydrants in general, but more particularly to that class known as "fire-plugs" or "fire-hydrants;" and my invention consists in so constructing the same that a double-valved hydrant, or one having two main or induction valves, is obtained; further, in such adaptation and arrangement of the two valves that the lower one performs the function of an auxiliary or supplemental valve, to allow the hydrant to be disconnected from the street-main for repairing or other purposes, thereby obviating the necessity of shutting off the supply of water from said mains; further, in the construction of the lower or supplemental valve and its operating mechanism, whereby the same is automatic in its action; further, in the construction and arrangement of the two main or induction valves and the waste-valve and their relation to each other, so that the waste-orifice can be entirely closed before water is let into the hydrant, and, on the other hand, the hydrant or main valve is always closed before the waste-orifice is uncovered; further, in so constructing the hydrant that the upper or main valve may be removed for repairs without impairing the functions of the hydrant; and, finally, in so applying the hydrant to a chest communicating with main distributing pipe or pipes that the plug or hydrant can be readily removed and replaced without cutting off the water from said chest, and without interfering with the flow of water to the adjoining plugs located upon said chest, all of which is more fully set forth hereinafter. If the hydrants are not supplied with auxiliary valves, the removal of a single hydrant from the main would necessitate the shutting off of all the water from the mains in the entire district by closing the stop-gates. The great importance of some such provision is evident when but few stop-gates are put in the mains, thereby making the districts so large that to shut off all the water, even for a short period of time, causes much inconvenience and annoyance, and in many instances—such as manufactories where steam-power is used—liability to accident occurs from want of water to supply the boilers. There is also considerable danger from the occurrence of fires in the district in which the water is shut off. Much labor and loss of time are also involved in closing the stop-gates of a district when it is desired to remove a faulty hydrant, and in many instances, particularly when gates of imperfect construction have been used, it is almost, if not quite, impossible to entirely shut off the water, and the gates frequently get out of order, and their spindles are broken or twisted in the attempt to close them. It also not unfrequently happens that the hydrant is located in a low part of a large district, and in such a case it is often necessary to bail out water for hours after removing the hydrant, since most or all of the water in the district or section of pipe distribution passes out of the opening to the main produced by such removal.

The object of my invention is to surmount or overcome all the objectionable features cited above by so constructing the supplemental or auxiliary valve that it shall in reality form a second or duplicate main valve, which shall always be closed when the upper valve is closed, thereby giving great security against leakage; that it shall work automatically, or, in other words, have a positive motion imparted to it in the act of opening and closing the main valve, and close entirely with or before the main valve; that there shall be no loose motion to produce trembling or vibration at times of opening and closing, avoiding the great danger to pipes and joints resulting from these causes; that the supplemental valve and its seat shall be readily accessible, should they be injured by any accident, and easily repaired or replaced; that said valve shall be so arranged with respect to the main valve and drip that the waste-orifice of the hydrant can be entirely closed before the supplemental valve opens to let on the water, and, reversely, that the supplemental valve be closed, shutting off the water and pressure from the main before the waste-orifice is uncovered, and to allow the main valve to be taken out for repairs without impairing the function of the hydrant.

Figure 3:
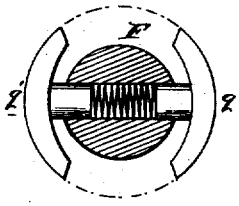
Figure 2:
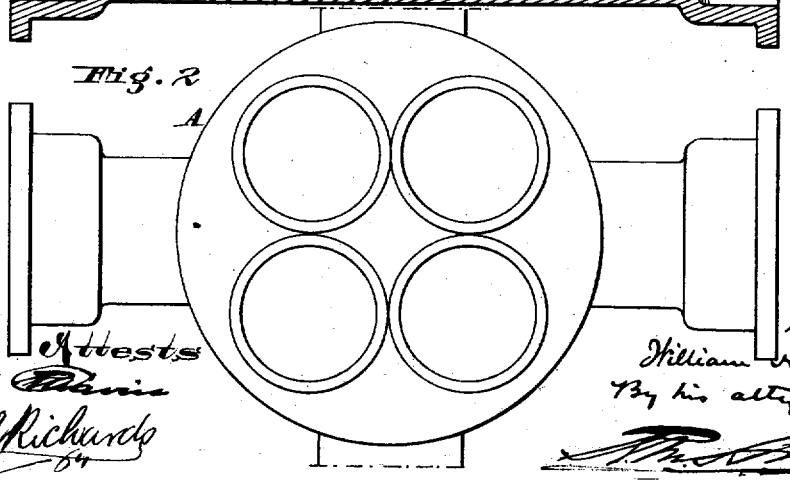

In the drawings, Figure 1 is a vertical section, showing two fire-plugs made according to my invention. Fig. 2 is a plan view of the chest to which the plugs or hydrants are applied, and Fig. 3 is a sectional plan view of the spindle and waste-valve.

In the present instance the plugs are illustrated as applied to a chest, A, with four branches adapted to the intersection of two main or distributing pipes, the chest being arranged for the reception of four plugs, two of which appear in Fig. 1.

In the top of the chest are four flanged openings, into each of which is screwed, or in which is otherwise secured, a tube or bushing, B, and to the latter is secured the upper end, *a*, of a support or chest, D, containing the supplemental valve E, the stem *b*, which passes through and is guided by the bottom of said chest, and a spring, *d*, tending to maintain the valve E in contact with its seat. Each chest has openings at the sides and bottom for the free access of water from the chest A.

Into the upper end of each tube B is screwed the lower end of the barrel or stock K of the plug, through a stuffing-box at the top of which passes the spindle or valve-rod F of the main or induction valve G, the latter being adapted to a seat on the lower end of the barrel, and the upper end of the valve-rod being attached to a slide, H, adapted to guides on a projection, I, of the barrel, this projection terminating in a hub, *i*, which is threaded internally for the reception of the externally-threaded tube J, the latter being also threaded internally for the reception of the threaded stem M of the slide H.

It will be observed that the screw-thread of the tube J is left-handed, and that of the stem M right-handed, so that by a comparatively slight effort, and by a comparatively limited movement of the tube J, an extended movement of the slide H, valve-rod F, and its valve D may be obtained. On each barrel K is a branch, *m*, furnished with the usual detachable screw-plug. The spindle or valve-rod F continues below the valve G, to form a pin, *g*, which enters a central orifice or hole in the supplemental valve E, and the two valves are so arranged and adjusted that the supplemental valve E will not be opened until the main valve G is slightly depressed and the waste-valve *q* closed, but will be the first to reach its seat in closing the valve, and thereby prevent all unnecessary waste of water.

The waste-valve is applied to the valve-rod F in the manner shown at the right-hand side of Fig. 1, and in the sectional plan, Fig. 3, an enlargement of the spindle or valve-rod in this case carrying two segmental valves, *q'*, adapted to openings in the barrel K, and having stems adapted to an opening in the enlarged portions of the valve-rod, and acted upon by a spring contained in said opening, which spring, in connection with the pressure of the water on the backs of the valves, maintains the latter in contact with their seats.

Each plug, with its valve-rod and valve, can be readily detached from the chest A, in doing which the supplemental valve immediately below that plug which is being thus detached must necessarily be closed to its seat by the pressure of the spring *d* and water, so that the flow of water to the other plugs of the group, or in the entire section or district, is in no way interrupted, and the usual shut-off or gate valves are dispensed with.

In order to prevent the tube B from being withdrawn with the barrel K, I secure the said tube to the chest A by means of a set-screw, *s*, or other means which will prevent its turning.

Although I have shown a group of four plugs applied to one chest, A, the latter may be adapted to one plug only, or to any desired number of plugs which circumstances may demand.

To obtain the best effect from my invention the valves G and E should be far enough apart that the lower or supplemental valve will close a short period of time before the upper or main valve reaches its seat, so as to allow the waste-orifice to open or close without unnecessary waste of water. This is effected by regulating the distance between the pin *g* and the bottom of the hole in the supplemental valve; but it would be within the scope of my invention if both valves closed simultaneously. By centering-pin *g* entering the centering-hole *e* during the descent of the main valve, and before the supplemental valve is depressed from its seat, the two valves are held rigidly in position against lateral movement or vibration.

I do not confine myself to any particular construction of hydrant, valve, valve-seats, or mechanism to raise the lower valve as the upper one ascends, as my invention consists, broadly, in any construction in which two valves, one above the other, always move in the same direction at or about the same time at every opening or closing of the hydrant, said valves being separate, in combination with suitable mechanism to automatically raise the lower as the upper one ascends.

It will be evident that my invention may be applied to hydrants in a manner which will be readily understood without description.

A suitable casing (indicated by dotted lines *x*) should surround the plug or group of plugs.

Having now described the general construction of my invention, I will proceed to set forth its mode of operation.

The tube J is rotated and the main valve lowered, during which the centering-pin *g* of valve G or its rod F enters the centering hole or cavity *e* in valve E, and after moving a sufficient distance to allow the sliding waste-valve *q* to cover the waste-orifice *w* the lower or supplemental valve E begins to open, through which the water passes into the hydrant from the main. In closing the reverse is the case, the lower or supplemental valve E first reaching its seat *a*, and shutting off the flow of water before the waste-orifice is opened, the upper valve E still having sufficient motion to allow the slide-valve to uncover waste-orifice *w* before it reaches its seat P, so that there is no waste of water from the main during the act of opening and closing the hydrant, or when the main and supplemental valves are open but a little way, as is usual in filling street-watering carts, flushing gutters, &c. In taking out the hydrant for repairs it is only necessary to unscrew the barrel or stock K from the chamber or chest A, leaving the frost case or jacket and chamber A with supplemental valve E and its raising mechanism in the ground, the action of the supplemental valve being absolutely automatic, and requiring no separate manipulation. From this it is seen that the supplemental valve is always closed when the main valve is closed, and being a perfectly-constructed valve, with heavy brass seat, I obtain double security against leakage from any cause, yet, while operated by a positive downward motion of the valve-rod F, the main and supplemental valves still act independently of each other, so that should any obstruction become lodged in the lower valve, thus preventing its closing, the main or upper valve could be brought home to its seat without difficulty, thus insuring the shutting off of the water from the hydrant. I thus get the greatest security that it is possible to obtain against leakage, which so frequently proves disastrous in the hydrants now used in our northern cities, causing much damage and breakage by freezing, and rendering the hydrants useless in time of fire.

The importance of closing the waste-orifice before any waste from the main is let into the hydrant cannot be too highly commented on, since in most, if not all, hydrants heretofore constructed the waste-orifice and the main valve would be open for a short period of time during the opening and closing of the valve, and when the main valve is only slightly opened the orifice is open all the time. By this there was great waste of water from the hydrant by direct pressure from the mains, the result being to saturate the ground around the hydrant, the waste frequently showing itself above the surface and preventing the rapid absorption of waste water from the hydrant by the ground, which is so necessary after using in extreme cold weather, causing water to remain in the stand-pipe of the hydrant until frozen.

If the upper or main valve becomes out of order, it can be removed from the valve-rod without in any way interfering with the working of the supplemental valve, which will now perform the function of the main valve, and the hydrant can be used continually.

Having now described my invention, what I claim as new, and desire to secure by Letters Patent, is—

1. The chest A at the intersection of two or more street-mains, combined with two or more independent hydrant or plug barrels, K, communicating with said chest and provided with valves, all as set forth.

2. The combination of the valve-spindle with the openings *w* in the barrel K, and with segmental spring-valves *q q'*, for closing or unclosing the said openings.

3. The combination of the valve-spindle F of a fire-plug or hydrant with the externally and internally threaded tube J, adapted to the threaded projection *i* and to the threaded stem M of the guided slide H, attached to the said spindle, all substantially as set forth.

4. In a hydrant, two separate main or induction valves situated one above the other, in combination with mechanism to raise or lower the upper valve, and mechanism to lower the lower valve positively and raise it automatically, incidental to the movement of the upper valve, the movement of the two valves being in the same direction at the same time, substantially as and for the purpose specified.

5. In a hydrant, two main or induction valves which are located one above the other, in combination with mechanism whereby the lower valve is operated in such a manner that it opens a short time after the upper valve has left its seat in its downward motion and closes a short time before the upper valve reaches its seat in its upward motion, substantially as and for the purpose specified.

6. In a hydrant, the combination of three valves—one main, one supplemental, and one waste valve—said valves being operated by suitable mechanism in such a manner that the supplemental valve always opens after the main valve opens and closes before it closes, and that the waste-orifice shall always be open when the main and the supplemental valves are closed, and that it shall always be closed when the supplemental valve is open to any degree, substantially as and for the purpose specified.

7. A hydrant having two main or induction valves closing positively upon their seats, the lower closing automatically and free from loose motion with respect to the valve-rod or its attachments, substantially as and for the purpose specified.

8. In a hydrant, a supplemental or auxiliary valve, E, to allow the hydrant to be taken up without shutting off the water from the district, said valve being made to open with the main valve G, with which it is combined, by a positive motion communicated through the valve-rod F, to which the main valve is attached, and always closing firmly against its seat *a* when the main valve G is closed, said supplemental valve being entirely separate and disconnected from said main valve and its rod, substantially as and for the purpose specified.

9. In a hydrant, the combination of supplemental valve E, adapted to open and close with valve G, provided with centering hole or cavity *e*, formed therein, and centering-pin *g*, secured to the main valve G, working together, as shown, for centering and steadying the valve E and preventing trembling or vibration at the time of opening and closing, and also preventing concussion or water-ram from too sudden closing of valve, said valve E always opening and closing with the main valve G, substantially as shown, and for the purpose specified.

10. In a hydrant, a supplemental valve, E, and its seat *a*, in combination with mechanism to open said valve in the act of opening the main valve and mechanism which automatically closes said supplemental valve before the main valve closes, substantially as and for the purpose specified.

11. In a hydrant, a valve-rod attached to and operating a waste-valve, in combination with an induction-valve which is entirely separate and distinct from said valve-rod or waste-valve, all operating in such a manner that the waste-orifice is always closed by its valve before the induction-valve is opened and the induction-valve is always closed before the waste-orifice is opened, substantially as shown and described.

12. In a hydrant, the combination of a main valve, adapted to be removed from its valve-rod, with a supplemental valve and suitable raising mechanism, the valve-rod acting to depress or open the said supplemental valve in its downward movement, as when operating in the main valve, for the purpose of performing the function of the main valve should the same be removed from its rod for repairs, thereby allowing the hydrant to be used during such repairs, substantially as described.

In testimony of which invention I hereunto set my hand.

WILLIAM H. McMILLAN.

Witnesses:
MORRIS L. RITCHIE,
GEORGE H. McMILLAN.